J. P. GARDNER.
PITMAN.
APPLICATION FILED APR. 11, 1914.
1,166,452.
Patented Jan. 4, 1916.
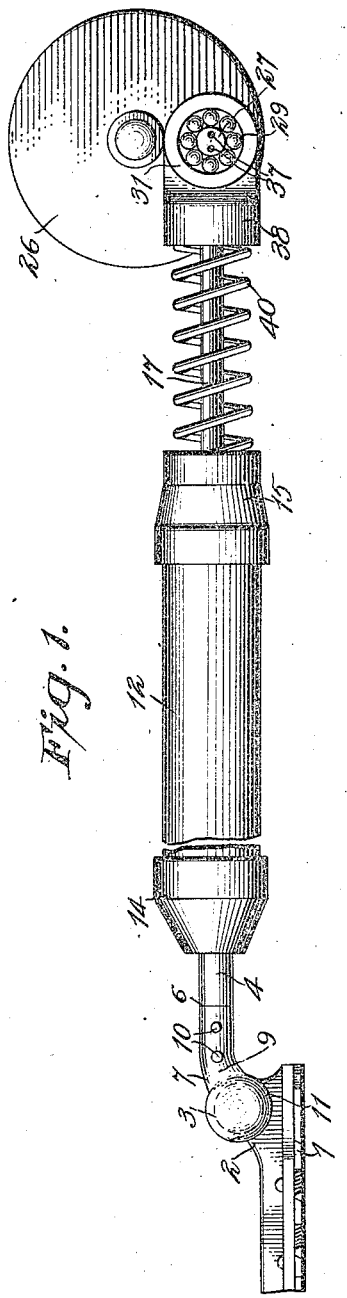
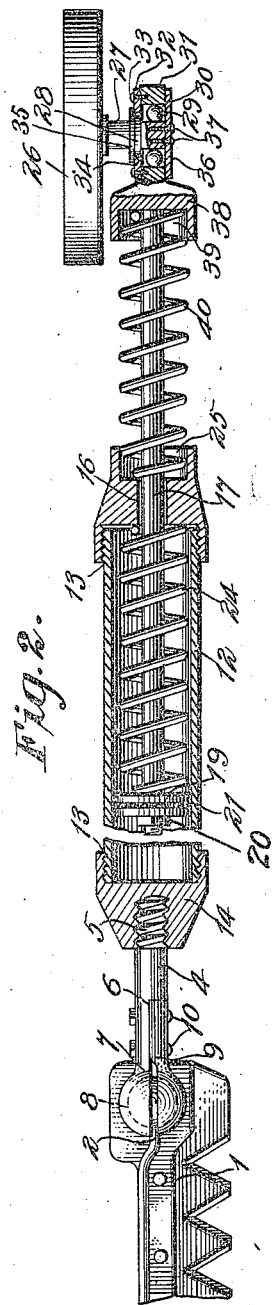
Witnesses:
William A. Peake
James H. Klouse
Inventor:
John P. Gardner

UNITED STATES PATENT OFFICE.

JOHN P. GARDNER, OF SAN FRANCISCO, CALIFORNIA.

PITMAN.

1,166,452.  Specification of Letters Patent.  Patented Jan. 4, 1916.

Application filed April 11, 1914. Serial No. 831,347.

*To all whom it may concern:*

Be it known that I, JOHN P. GARDNER, a citizen of the United States, residing at San Francisco, in the county of San Francisco and State of California, have invented a new and useful Pitman; and I do hereby declare the following to be a full, clear, and exact description of the invention, such as will enable others skilled in the art to which it appertains to make and use the same.

This invention relates to a roller bearing and pitman rod connection for mowing machines, harvesters and the like, and an object of the invention is to provide a pitman rod connection of this nature, which will automatically yield in case the cutting knife becomes obstructed in any manner whatsoever, and permit the rotating or revolving means to rotate or operate unobstructedly. In practical fields the details of construction may necessitate alterations, falling within the scope of what is claimed.

The invention comprises further features and combination of parts, as hereinafter set forth, shown in the drawings and claimed.

In the drawings: Figure 1 is a view in side elevation, showing the improved yielding connections between the reciprocating cutting member and the roller bearing connection on the revolving pitman wheel. Fig. 2 is a plan view partly in section of the pitman wheel and the roller bearing connection and the yielding connection.

Referring more particularly to the drawings, 1 designates a reciprocating member or cutting bar having an ear 2, formed with an integral ball 3. A rod 4 provided with threads 5 at one end is provided. The other end portion of the rod 4 is cut away as shown at 6 to form a reduced part 7, which terminates in a semi-spherical socket 8, which fits one side of the ball 3. A plate 9 conforming to the contour of the rod 4 is provided, and is bolted at 10 in the cut-away portion 6 of the rod. One end of this plate 9 terminates in a semi-spherical socket 11, which fits the other side of the ball 3, and coöperates with the socket 8, thereby providing a substantially ball and socket pivotal joint with the rod 4. A tubular casing 12 is provided, which is threaded at 13 at both ends. A cap 14 engages the threads 13 of one end of the tubular casing, and into the cap 14 the threaded end of the rod 4 is threaded. A cap 15 having a central opening 16 is threaded to the threads 13 at the other end of the tubular casing. Extending through the cap 15 is a piston rod 17, on the end 18 of which a piston 19 is secured by the nut 20. The piston 19 is provided with a suitable packing 21, and is mounted to reciprocate in said tubular casing. Arranged in the tubular casing 12, and surrounding the piston rod and interposed between the piston 19 and the cap 15 is a coil spring 24, acting to hold the piston 19 yieldably spaced apart from the cap 15. One end of the cap 15 has a pocket 25. A revolving or rotating member or wheel 26 of any suitable mowing machine or harvesting machine or the like (not shown) is provided, and is provided with a wrist pin 27 having an integral collar 28, and beyond the collar the wrist pin 27 is engaged by the roller bearings 29, which are arranged in the central opening 30 of the disk head 31. A disk washer or ring 32 is secured to the disk head 31 by the screws 32, so that the opening 34 of the washer 32 receives a part of the integral collar 28. It is to be noted that the integral collar 28 has a shoulder 35, which is contacted with by one face of the washer 32, thereby preventing the head 31 from moving toward the wheel 26. The washer 32 or ring assists in retaining the roller bearings in place. A disk washer 36 is secured by the screws 37 to the outer end of the wrist pin, thereby preventing displacement of the disk head 31. The disk head 31 is carried by the piston rod 17, as shown at 38 in any suitable manner, and where the piston rod connects to the head, the head is provided with a pocket 39. Surrounding the piston rod 17 and engaging the pockets 25 and 39 is a coil spring 40, which counteracts against the coil spring 24, thereby holding the piston 19 substantially at the junction indicated in Fig. 2, that is, under normal conditions, for instance, when the reciprocating or cutting member or cycle bar is operating properly and not being obstructed. However, it is to be noted that just as soon as the reciprocating member or cycle bar becomes obstructed, the rotating or revoluble member or wheel 26 will continue to rotate or revolve, the springs 24 and 40 counteracting one another and yielding, incident to the reciprocating movement of the piston.

The invention having been set forth, what is claimed as new and useful is:—

In combination, a reciprocating member, a tubular casing having a rod at one end, said rod having a ball pivotal joint with the reciprocating member, one end of the casing having a cap having a pocket at its outer end and a central opening concentric with the coutour of the pocket, a piston rod extending through the central opening and provided with a piston reciprocating in the casing, a coil spring interposed between the cap and the piston, a revoluble member having a wrist pin, said piston rod having a disk head at one end, said disk head having a central opening, and an enlargement provided with a pocket, a coil spring on the piston rod interposed between the pocket of the cap and the pocket of the enlargement, roller bearings in the central opening of the disk head and engaging anti-frictionally with the wrist pin, and means upon each face of the disk head to prevent displacement of the disk head and the roller bearing, the means upon the outer face of the disk head being secured to the wrist pin.

In testimony whereof I have signed my name to this specification in the presence of two subscribing witnesses.

JOHN P. GARDNER.

Witnesses:
 WILLIAM A. PEAKE,
 J. H. KLOUSE.